United States Patent
Hatch et al.

(10) Patent No.: US 11,584,858 B2
(45) Date of Patent: Feb. 21, 2023

(54) DRY POWDER THERMOSETTING RESIN COMPOSITION

(71) Applicant: H.B. Fuller Company, St. Paul, MN (US)

(72) Inventors: Geoffrey D. Hatch, Leyland (GB); Andrew Carr, Blackpool (GB)

(73) Assignee: H.B. Fuller Company, St. Paul, MN (US)

( * ) Notice: Subject to any disclaimer, the term of this patent is extended or adjusted under 35 U.S.C. 154(b) by 141 days.

(21) Appl. No.: 16/778,329

(22) Filed: Jan. 31, 2020

(65) Prior Publication Data

US 2020/0248004 A1 Aug. 6, 2020

Related U.S. Application Data

(60) Provisional application No. 62/800,156, filed on Feb. 1, 2019.

(51) Int. Cl.
| | |
|---|---|
| *C09D 5/03* | (2006.01) |
| *C09J 9/00* | (2006.01) |
| *B05D 1/06* | (2006.01) |
| *B05D 1/24* | (2006.01) |

(52) U.S. Cl.
CPC .............. *C09D 5/031* (2013.01); *B05D 1/06* (2013.01); *B05D 1/24* (2013.01); *C09J 9/00* (2013.01)

(58) Field of Classification Search
None
See application file for complete search history.

(56) References Cited

U.S. PATENT DOCUMENTS

| | | |
|---|---|---|
| 4,014,827 A | 3/1977 | Hart et al. |
| 4,605,696 A | 8/1986 | Benko et al. |
| 5,379,947 A | 1/1995 | Williams et al. |
| 5,635,548 A | 6/1997 | Kittle et al. |
| 7,456,241 B2 | 11/2008 | McFaddin et al. |
| 8,709,195 B2 | 4/2014 | Halladay |
| 2009/0130469 A1 | 5/2009 | Wei et al. |
| 2011/0209822 A1* | 9/2011 | Halladay ................. C08L 21/00 156/335 |
| 2018/0273768 A1* | 9/2018 | Shiozaki .............. C09D 167/02 |
| 2020/0339763 A1* | 10/2020 | Gorin ..................... B33Y 70/00 |

FOREIGN PATENT DOCUMENTS

| | | |
|---|---|---|
| CN | 102532969 | 2/2014 |
| CN | 10750281 | 12/2017 |
| EP | 0340208 | 11/1989 |
| EP | 3376299 | 9/2018 |

* cited by examiner

*Primary Examiner* — Ronak C Patel

(74) *Attorney, Agent, or Firm* — Daniel Barta; Kirsten Stone

(57) ABSTRACT

The present invention discloses a dry powder composition comprising a thermosetting resin in particulate form, wherein the dry powder composition has a particle size measured according to ISO 13320 (2009) characterized by a $D_{v90}$ of 50 μm or lower, a $D_{v50}$ in the range of 5.1 to 12.5 μm, and a ratio of $$\frac{Dv90 - Dv10}{Dv50}$$

in the range of 1.5 to 4.2. The present invention also discloses processes for preparing the dry powder using jet milling, and processes of applying the dry powder composition to a metal surface. Furthermore, the present invention discloses the uses of the dry powder composition as a bonding material or as an adhesion promoter in a polymer compound.

20 Claims, No Drawings

DRY POWDER THERMOSETTING RESIN COMPOSITION

This application claims priority to and benefit of U.S. Provisional Patent Application No. 62/800,156, filed on Feb. 1, 2019 and incorporated herewith.

FIELD OF THE INVENTION

The present invention relates to a dry powder composition comprising a thermosetting resin in particulate form. The dry powder composition according to the present invention exhibits a defined low particle size and a narrow particle size distribution. The present invention also relates to processes for obtaining the dry powder composition. The dry powder composition can be employed for a variety of uses including as a bonding material.

BACKGROUND OF THE INVENTION

Bonding agents based on thermosetting resins are well-known in the art. Such bonding agents are typically applied via wet spraying, roller coating or dipping processes using the active ingredients dispersed and/or dissolved in a solvent. This necessarily involves a wet production process including milling to obtain the required particle size of the dispersed ingredients. The presence of solvent, which has to be removed after application, in the bonding agent increases costs and efforts of the production process and of shipping of the bonding agent, and is undesired from an environmental viewpoint. Therefore, attempts have been made for obtaining powdered coating compositions.

For example, U.S. Pat. No. 8,709,195 discloses a powder primer composition in connection with rubber to metal bonding. However, U.S. Pat. No. 8,709,195 does not disclose special dry coating application techniques or suitable particle sizes of the powder primer composition and, thus, also does not mention techniques for advantageously milling the powder primer composition so as to obtain a suitable particle size.

Various milling techniques for grinding solids to powder are known in the art. For example, U.S. Pat. No. 5,379,947 uses jet milling for preparing a powder composition. At least 50% of the particles in the powder composition have particle sizes in the range of 3 to 5 µm, which means that the median particle size is below 5 µm. Furthermore, before application as a coating agent, the powder composition is processed into a slurry using a solvent or liquid.

Methods of applying a dry powder coating to a substrate are likewise known in the art. For example, electrostatic spraying is a coating method which uses a spray gun to create an electrical charge on powder particles, while the substrate to be coated is grounded (made neutral). In the electrostatic spraying process, the powder to be used as coating is fluidized using air. This fluidized powder is supplied to the spray gun through a small hose. The nozzle of the spray gun uses high-voltage DC power to charge the fluidized powder particles and deposit them on the substrate. Alternatively, the panicles are charged by friction as they interact with the spray gun and pipe internal surface.

In order to get a consistent, low coat weight, the particle size and the particle size distribution of the powder to be coated is critical. For example, amounts of particles larger than e.g. 30 µm tend to result in an unnecessarily thicker coat weight film. On the other hand, in the presence of significant amounts of particles smaller than e.g. 5 µm, fluidization of the powder before spraying is impaired.

Thus, there is a need in the art for dry powder compositions suitable as a bonding agent having an advantageous particle size distribution for electrostatic spraying, as well as for processes for obtaining such dry powder compositions. The dry powder composition may be suitable for other applications as well.

SUMMARY OF THE INVENTION

The present invention relates to a dry powder composition comprising a thermosetting resin in particulate form, wherein the dry powder composition has a particle size measured according to ISO 13320 (2009) characterized by
  a $D_{v90}$ of 50 µm or lower,
  a $D_{v50}$ in the range of 5.1 to 12.5 µm, and
  a ratio of $$\frac{Dv90 - Dv10}{Dv50}$$

in the range of 1.5 to 4.2.

The present invention further relates to a process for preparing the above dry powder composition, the process comprising the steps:
  (i) providing a precursor composition comprising a thermosetting resin in particulate form, and
  (ii) jet milling the precursor composition in a jet mill until a particle size $D_{v90}$ measured according to ISO 13320 (2009) of 50 µm or lower is reached.

Furthermore, the present invention provides a process of applying a dry powder composition to a metal surface, the process comprising the step:
  (i) applying the above-defined dry powder composition according the invention onto a metal surface by means of electrostatic spraying or fluidized bed dipping.

The present invention also relates to the use of the dry powder composition according to the invention as a bonding material.

In addition, the present invention relates to the use of the dry powder composition according to the invention as an adhesion promoter in a polymer compound.

DETAILED DESCRIPTION OF THE INVENTION

As outlined above, the present invention provides a dry powder composition comprising a thermosetting resin in particulate form, wherein the dry powder composition has a particle size measured according to ISO 13320 (2009) characterized by
  a $D_{v90}$ of 50 µm or lower,
  a $D_{v50}$ in the range of 5.1 to 12.5 µm, and
  a ratio of $$\frac{Dv90 - Dv10}{Dv50}$$

in the range of 1.5 to 4.2.

Particle size parameters as used in the present invention are obtained by laser diffraction according to ISO 13320 (2009). The particle size parameters refer according to the present invention to the thy powder composition as a whole not to individual components only. Suitable measurement devices for determining particles sizes by laser diffraction are commercially available e.g. from Malvern Panalytical, UK. An illustrative measurement devise includes e.g. Malvern's Mastersizer 3000.

The term "$D_{v90}$" is defined according to the present invention as known in the art and refers to the maximum particle diameter below which 90% of the sample volume exists. According to the invention, the particle size $D_{v90}$ of the dry powder composition is 50 μm or lower. In an embodiment, the dry powder composition has a particle size $D_{v90}$ of 45 μm or lower, or even 30 μm or lower. In a more preferred embodiment, the dry powder composition has a particle size $D_{v90}$ of from 10 μm to 50 μm, or even from 12 μm to 45 μm.

The term "$D_{v50}$" refers to the maximum particle diameter below which 50% of the sample volume exists—also known in the art as the median particle size by volume. According to the invention, the particle size of the powder composition should not be too high and not be too low. Accordingly, the dry powder composition according to the present invention has a particle size $D_{v50}$ (median particle size) in the range of 5.1 to 12.5 μm. In a preferred embodiment, the dry powder composition has a particle size $D_{v50}$ in the range of 6 to 12 μm. For example, in an illustrative embodiment, the dry powder composition may even have a particle size $D_{v50}$ such as 8 to 12 μm.

The term "$D_{v10}$" refers to the maximum particle diameter below which 10% of the sample volume exists. The dry powder composition according to may have a particle size $D_{v10}$ measured of 0.9 μm or higher, preferably 0.95 μm or higher.

The ratio of $$\frac{Dv90 - Dv10}{Dv50}$$

defines the broadness, more precisely narrowness, of the particle size distribution of the dry powder composition according to the invention. The particle size distribution should according to the present invention be relatively narrow. Accordingly, the dry powder composition of the invention has a ratio of $$\frac{Dv90 - Dv10}{Dv50}$$

in the range of 1.5 to 4.2. In an embodiment, the ratio of (Dv90−Dv10)/Dv50 is in the range of 1.5 to 4.0. In a preferred embodiment, the ratio of $$\frac{Dv90 - Dv10}{Dv50}$$

is in the range of 2.0 to 3.8. More preferably, the ratio of $$\frac{Dv90 - Dv10}{Dv50}$$

is in the range of 2.3 to 3.8. For example, in an illustrative embodiment, the dry powder composition may even have a ratio $$\frac{Dv90 - Dv10}{Dv50}$$

in the range of 2.5 to 3.8 μm.

The term "$D_{v99}$" refers to the maximum particle diameter below which 99% of the sample volume exists. The dry powder composition is preferably free of particles of greater particle sizes. Therefore, the dry powder composition may have a particle size $D_{v99}$ of 90 μm or lower, such as 80 μm or lower.

Components

The dry powder composition according to the present invention comprises a thermosetting resin in particulate form. The term "thermosetting resin" (also known as thermosetting plastic or thermosetting polymer) is known in the art and refers to a polymer which becomes irreversibly hardened upon being cured. A cured thermosetting polymer is called a thermoset. The thermosetting resins used according to the invention are present in particulate form even prior to curing. Various types of thermosetting resins are suitable in the context of the present invention, including but not limited to phenolic resins, modified phenolic resins (such as CNSL modified, inorganically modified or rubber modified phenolic resins), phenoxy resins, vinyl resins (such as PVA, PVOH, PVOH copolymers, or polyvinyl butyral resins, etc.), vinyl copolymer resins, epoxy resins, epoxy cresol novolac resins, resorcinol resins, polyester resins, polyurethane resins, etc.

In a preferred embodiment, the thermosetting resin is a phenolic resin. More preferably, the thermosetting resin is a phenol formaldehyde resin. Phenol formaldehyde resins as known in the art are synthetic polymers obtained by the reaction of phenol or substituted phenol with formaldehyde. In an even more preferred embodiment, the thermosetting resin is a novolac resin. Novolac resins are phenol formaldehyde resins with a formaldehyde to phenol molar ratio of less than one.

The thermosetting resin is typically present in the dry powder composition in an amount of 60 to 90% by weight, based on the total weight of the dry powder composition. In a preferred embodiment, the thermosetting resin is present in an amount of 65 to 80% by weight.

The thermosetting resin is cured (hardened) by the action of heat or suitable radiation and/or the use of a curative. Curatives as known in the art are sometimes also termed a hardener. Phenolic resins as used in some preferred embodiments of the present invention typically require the use of a curative for hardening. Thus, in a preferred embodiment, the dry powder composition according to the invention further comprises a curative. The curative typically includes amine groups bonded to each other e.g. via methylene bridges. Examples of suitable curatives include, but are not limited to hexamethylenetetramine (urotropine), hexamethoxymethylmelamine, formaldehyde, formalin, acetaldehyde, propionaldehyde, isobutyraldehyde, 2-ethylhexyldehyde, 2-methylpentaldehyde, 2-ethylhexyldehyde, benzaldehyde, as well as compounds which decompose to formaldehyde, such as paraformaldehyde, trioxane, furfural, benzoxazines and Mannich bases, anhydromaldehydeaniline, ethylene diamine formaldehyde, acetals which liberate formaldehyde on heating, methylol derivatives of urea and formaldehyde and methylol phenolic compounds. In a preferred embodiment, the curative is selected from the group consisting of hexamethylenetetramine and hexamethoxymethylmelamine. In a more preferred embodiment, the curative is hexamethylenetetramine.

The curative may be present in the dry powder composition in an amount of 1 to 10% by weight, based on the total weight of the dry powder composition. In a preferred embodiment, the curative is present in an amount of 2 to 7% by weight.

The dry powder composition according to the present invention additionally may comprise at least one inorganic particulate material. In an embodiment, the inorganic particulate material is selected from the group consisting of anti-caking additives, anti-corrosive pigments and inorganic fillers as defined in more detail below.

In an embodiment, the dry powder composition comprises anti-caking additive. Anti-caking additives are additives placed in powdered or granulated materials to prevent the formation of lumps (caking). Illustrative anti-caking additives include but are not limited to silica, stearates of calcium or magnesium, calcium silicate, talc, aluminum silicate, bentonite, etc. In an embodiment, the anti-caking additive is silica. In a preferred embodiment, the anti-caking additive is amorphous silica, treated silica, or a combination thereof Illustrative examples of treated silica as known in the art include hydrophobic silica or fumed silica.

The anti-caking additive may be present in the dry powder composition in an amount of 1 to 10% by weight, based on the total weight of the dry powder composition. In a preferred embodiment, the anti-caking additive is present in an amount of 1 to 7% by weight, more preferably 2 to 5% by weight.

In an embodiment, the dry powder composition may comprise an anti-corrosive pigment. Anti-corrosive pigments are used to protect metal surfaces from corroding in corrosive environments. They typically contain elements such as aluminum or zinc which oxidize sacrificially to ensure the protected element remains corrosion free. In an embodiment, the anti-corrosive pigment is selected from a group consisting of zinc oxide, zinc phosphate, titanium dioxide, aluminum triphosphate and a combination thereof.

The anti-corrosive pigment may be present in a total amount of e.g. 5 to 25% by weight, based on the total weight of the dry powder composition. Preferably, the anti-corrosive pigment is present in a total amount of 10 to 20% by weight.

In a further embodiment, the dry powder composition optionally also may comprise an inorganic filler. The term "inorganic filler" is used in the context of the present invention for non-functional inorganic particulate material as opposed to functional inorganic particulate material such as anti-caking additives and anti-corrosive pigments discussed above. The inorganic filler is mainly used to lower the consumption of more expensive components but may, however, be employed to impart a desired color to the dry powder composition and possibly provide reinforcement or a combination thereof. In an embodiment, the inorganic filler is selected from a group consisting of carbon black, clay, $CaCO_3$ and a combination thereof. In a preferred embodiment, the inorganic filler is a black pigment such as carbon black.

The optional inorganic filler may be included in the dry powder composition in an amount of 0 to 15% by weight, based on the total weight of the dry powder composition. For example, the inorganic filler may be included in an amount of 1 to 10% by weight, preferably 2 to 5% by weight.

Illustrative dry powder compositions according to the present invention may include, based on the total weight of the dry powder composition:
60-90% by weight of thermosetting resin,
1-10% by weight of curative,
1-10% by weight of anti-caking additive,
5-25% by weight of anti-corrosive pigment, and
0-15% by weight of inorganic filler.

More preferred illustrative dry powder compositions of the present invention include, based on the total weight of the dry powder composition:
60-90% by weight of phenolic resin,
1-10% by weight of hexamethylenetetramine,
1-10% by weight of silica, preferably treated silica,
10-20% by weight of a combination of zinc oxide, zinc phosphate, titanium dioxide, aluminum triphosphate, and
1-10% by weight of carbon black.

For example, the dry powder composition according to the invention may include, based on the total weight of the dry powder composition:
65-80% by weight of phenolic resin,
2-7% by weight of hexamethylenetetramine,
2-3% by weight of amorphous silica,
0.2-1% by weight of treated silica,
5-8% by weight of zinc oxide,
7-9% by weight of zinc phosphate,
3-5% by weight of titanium dioxide, and
3-4% by weight of carbon black.

Process of Preparation

The present invention also relates to a process for preparing the dry powder composition having a defined particle size and narrow particle size distribution. Thus, the present invention provides a process for preparing the dry powder composition according to the invention, the process comprising the steps:
(i) providing a precursor composition comprising a thermosetting resin in particulate form, and
(ii) jet milling the precursor composition a jet mill until a particle size $D_{v90}$ of 50 μm or lower is reached.

The precursor composition includes the components of the dry powder composition, such as the thermosetting resin, in particulate form in e.g. commercially available particle sizes. Alternatively, the components of the dry powder composition optionally may be premilled individually or in the form of a blend using conventional milling techniques. The precursor composition is introduced into a jet mill for jet milling. A jet mill as known in the art grinds the materials by using a high speed jet of compressed air or inert gas to impact particles into each other. According to the present invention, jet milling of the precursor composition is continued until the desired particle size as defined above is reached. In particular, jet milling the precursor composition in the jet mill is maintained according to the present invention until a particle size $D_{v90}$ of 50 μm or lower is reached. Preferably, jet milling is carried out until a particle size $D_{v50}$ in the range of 5.1 to 12.5 μm is reached.

In a preferred embodiment, the jet mill comprises a classifier wheel. A classifier wheel basically is a cohesively rotating immersion tube having a speed adjustable motor. The obtained fineness of the milled particles is a function of the rotational speed of the classifier wheel. Fine product particles, whose size correspond to the preset parameters, are removed from the jet mill, while particles that are too large are rejected by the classifier wheel and are returned for further milling. In this way, a desired particle size, a defined upper particle size limitation and at the same time a narrow particle size distribution can be obtained. Suitable jet mills equipped with a classifier wheel are commercially available, e.g., from NETZSCH Trockenmahltechnik GmbH, Germany, An illustrative example of a suitable jet mill is the product ConJet® from NETZSCH.

Applications and Uses

The dry powder composition of the present invention can be applied using various methods known in the art. For example, the dry powder composition can be employed in the form of dry particulates using dry coating techniques such as electrostatic spraying or fluidized bed dipping. Alternatively, the dry powder composition can be dispersed or dissolved before use in a solvent, e.g., water or an organic solvent such as a combination of water and ethanol. The particle size and particle size distribution of the dry powder composition is suitable for providing easy dispersion in e.g. water based solvents. Suitable wet application techniques include e.g. wet spraying, roller coating or dipping processes as known in the art.

In one embodiment, the present invention provides a process of applying a dry powder composition to a metal surface, the process comprising the step:
  (i) applying the dry powder composition of the invention as defined above onto a metal surface by means of electrostatic spraying or fluidized bed dipping.

The present inventors have found a method of adjusting the particle size and particle size distribution of dry powder based thermosetting bonding agents so as to directly fit the needs of electrostatic spraying. The dry powder composition prepared in accordance with the above preparation process does not include particles large enough to block the spray gun in electrostatic spraying. At the same time, the particle size of the dry powder composition is not too low and is sufficiently narrow so as to facilitate fluidization of the dry powder before spraying or during fluidized bed dipping.

The method of electrospraying is in principle carried out as known in the art except that the dry powder composition of the present invention is used. Furthermore, the method of is fluidized bed dipping in principle is also known. In fluidized bed powder coating, heated parts are either dipped directly into a container of fluidized powder or passed through an electrically charged cloud of powder, which is created above a container of fluidized powder. The metal onto which surface the dry powder composition can be applied is not specifically limited and includes e.g. iron, steel (including but not limited to such as mild steel and stainless steel), aluminum, brass and other alloys including any of these metals optionally possessing a surface treatment such as with phosphate or zinc nickel.

As already indicated above, the dry powder composition according to the present invention is suitable as a bonding material. Bonding material as used herein can be selected from the group consisting of coating, primer, adhesive and adhesion promoter. A primer is material used to improve the adhesion of one substrate to another. An adhesive is used to adhere two materials together. An adhesion promoter is a material added to a second material to improve its ability to adhere to a third material.

In one embodiment, the dry powder composition is used as a primer for the manufacture of brake pads or brake shoes. Brake pads are a component of disc brakes used in automotive and other applications. Brake pads are steel backing plates with friction material bound to the surface that faces the disc brake rotor. A brake shoe is the part of a braking system which carries the brake lining in the drum brakes used on automobiles, or the brake block in train brakes and bicycle brakes. The brake shoe carries the friction material based brake lining, which is bonded to the shoe. When the brake is applied, the shoe moves and presses the lining against the inside of the drum. The manufacture of brake pads or brake shoes is in principle known in the art. According to the present invention, the inventive dry powder composition is applied to the metal backplate and is overcoated with friction material. The layered construction is pressed and processed to cure friction material and bonding agent at the same time.

The dry powder composition according to the invention can also be used to bond a brake shim to the reverse side of the brake pad. Brake shims are thin metal or rubber pads that fit between the brake pad and the brake caliper to correct small differences that sometimes lead to noise. These brake shims are mainly used to keep the noise down and any rattles to a minimum. The dry powder composition of the invention can also be applied as a protective coating onto the brake pad by electrostatic spraying. The coated brake pad is then heated to a high temperature to adhere and cure the coating to the brake pad. This can be for both corrosion protection and the look of the final part.

The dry powder composition of the present invention is suitable for other application fields as well. For example, the dry powder composition can be used as an adhesion promoter in a polymer (e.g. rubber) compound. The addition of adhesion promoters to polymer compounds is in principle known in the art. The dry powder compositions of the present invention can be used to replace conventional prior art adhesion promoters, e.g. in the field of rubber to fabric bonding. Suitable fabrics include e.g. nylon. Suitable polymer compounds include, but are not limited to rubber compounds based on natural rubber (NR) or synthetic rubber including styrene-butadiene rubber (SBR), butadiene rubber (BR), nitrile butadiene rubber (NBR), ethylene propylene diene monomer rubber (EPDM), isoprene rubber (IR) or isobutylene-isoprene rubber (HR), or mixtures thereof. In one embodiment, the dry powder composition of the present invention is added as an adhesion promoter into an EPDM rubber composition for the manufacture of a hose, such as a reinforced rubber hose.

The present invention is further illustrated by means of the following examples.

EXAMPLES

Example 1: Ability to Generate Bonding Agent Suitable for Wet Spray or Roller Applications Mix A: 140 g of a free flowing, milled, dry powder composition ($D_{v90}$=15.9 μm; $D_{v50}$=6.25 μm; ($D_{v90}$−$D_{v10}$)/$D_{50}$=2.36) comprising a thermosetting resin in particulate form was added to 212 ml of deionised water under agitation. Additional ingredients were added in two separate additions. The first group of ingredients were added ander high shear agitation and once fully dispersed, the remaining ingredients added under agitation to achieve a corresponding formulation of an industry standard phenolic based wet bonding agent as supplied by HB Fuller. The vessel was stirred for a further 60 minutes before filtering and analysis.

Re-dispersed Mix A showed no undispersed residues.
Physical Data:

|  | Wet reference bonding agent | Mix A |
|---|---|---|
| Solids[1] [%] | 35.4 | 35.2 |
| Viscosity[2] [s] | 40 | 41 |
| Hegman Grind [μm] | 15 | 15 |
| Specific Gravity @ 26° C. | 1.11 | 1.11 |

[1]Solids measured by drying for 2 hours at 105° C.
[2]Viscosity measurement carried out using a Din 4 cup @ 26° C.

Bonding Results:

Suitable test pieces for quadruple lap shear analysis were prepared using both an industry standard phenolic based wet bonding agent as supplied by HB Fuller and the above re-dispersed Mix A (applied using a spatula before allowing to air dry to a dry film thickness (DFT) of 25 microns), Each mild steel test piece was MEK degreased, G17 grit blasted to Ra 9-10 microns, MEK degreased prior to coating. The test pieces were pressed using Midland Brake 450 semi cured friction material (25 mins @180° C.)@10% compression followed by 1 hour 300° C. post cure. Unless specified each test piece was left for 24 hours prior to any testing.

|  | Shear testing conditions | Shear Force [N] | Mode of Failure |
|---|---|---|---|
| Wet reference bonding agent | 180° C. OFF Press Shear | 1411 | 100% Retention |
|  | Cold Shear | 4569 | 100% Retention |
|  | 1 hr 300° C. Post Cure Shear | 7835 | 100% Retention |
|  | 1000 hrs 160° C. Glycol | 6016 | 100% Retention |
|  | 1000 hrs Salt Spray | 5268 | 100% Retention |
| Mix A | 180° C. OFF Press Shear | 1166 | 100% Retention |
|  | Cold Shear | 4470 | 100% Retention |
|  | 1 hr 300° C. Post Cure Shear | 7814 | 100% Retention |
|  | 1000 hrs 160° C. Glycol | 6308 | 100% Retention |
|  | 1000 hrs Salt Spray | 4259 | 100% Retention |

As can be seen from the above, a dry powder composition comprising a thermosetting resin in particulate form can be shipped to a customer, and can be re-dispersed in liquid to be used as a conventional wet bonding agent with maintained bonding performance.

Example 2: Bonding Performance of Formulation

Suitable test pieces for mono lap shear analysis were prepared using both an industry standard phenolic based wet bonding agent as supplied by HB Fuller (applied using spatula before allowing to air dry to a DFT of 25 microns) and a free flowing, milled, dry powder composition comprising a thermosetting resin in particulate form ($D_{v90}$=15.9 μm; $D_{v50}$=6.25 μm; ($D_{v90}$−$D_{v10}$)/$D_{v50}$=2.36—applied manually as a dry powder to a DFT of 25 microns). Each mild steel test piece was MEK degreased, G17 grit blasted to Ra9-10 microns, MEK degreased prior to coating. The test pieces were pressed using Midland Brake 450 semi cured friction material (25 mins @180°C.)@10% compression followed by 1 hour 300° C. post cure, Unless specified each test piece was left for 24 hours prior to any testing.

|  | Shear testing conditions | Shear Force [N] | Mode of Failure |
|---|---|---|---|
| Wet reference bonding agent | Cold Shear | 3315 | 100% Retention |
|  | 1 hr 300° C. Post Cure Shear | 654 | 100% Retention |
|  | 1000 hrs 160° C. Glycol | 3577 | 100% Retention |
|  | 1000 hrs Salt Spray | 2811 | 98% Retention/2% Cement metal failure |
| Free flowing, milled powder | Cold Shear | 3460 | 100% Retention |
|  | 1 hr 300° C. Post Cure Shear | 655 | 100% Retention |
|  | 1000 hrs 160C Glycol | 3395 | 100% Retention |
|  | 1000 hrs Salt Spray | 2613 | 99.5% Retention/0.5% Cement metal failure |

As can be seen from the above, a dry powder composition comprising a thermosetting resin in particulate form can be used instead of a conventional wet bonding agent with maintained bonding performance.

Example 3: Particle Size

Samples of a free flowing dry powder comprising a thermosetting resin were obtained using the jet mill described above, each with a different particle size and particle size distribution. The sample parameters are listed below:

|  | Sample # | | | | | | | |
|---|---|---|---|---|---|---|---|---|
|  | A | B | C | D | E | F | G | H |
| $D_{v90}$ [µm] | 6.9 | 15.9 | 25.8 | 35.7 | 43.8 | 74.3 | 101 | 22.8 |
| $D_{v50}$ [µm] | 3.46 | 6.25 | 8.58 | 9.16 | 12.2 | 21.0 | 15.5 | 5.36 |
| $D_{v10}$ [µm] | 0.49 | 1.15 | 0.93 | 0.99 | 1.29 | 2.3 | 1.28 | 0.702 |
| $(D_{v90} - D_{v10})/D_{v50}$ | 1.88 | 2.36 | 2.88 | 3.79 | 3.50 | 3.33 | 6.43 | 4.12 |

Each sample was then loaded in turn into the supply hopper of a Nordson Encore® LT electrostatic spray gun and assessed for fluidisation (ranked following bed observation), application (ranked based off cloud stability and blocking), and surface coverage/film thickness with identical number of passes on a flat metal plate.

The resulting observations can be found below (ranking in order 1 best and 8 worst):

|  | Sample # | | | | | | | |
|---|---|---|---|---|---|---|---|---|
|  | A | B | C | D | E | F | G | H |
| Fluidisation (ranked) | 6 | 4 | 3 | 1 | 2 | 7 | 8 | 5 |
| Application (ranked) | 8 | 7 | 5 | 2 | 1 | 3 | 4 | 6 |
| Film Thickness [µm] | 10.5 | 13.1 | 12.5 | 28.6 | 27.9 | 23 | 37.5 | 28.6 |

The optimal formulations for application during this study were found to be samples D and E and with further process optimisation, sample C. The broad distribution of sample G as compared to the narrower distribution of sample C, has shown to have overall detrimental application properties and further highlights the need for a defined (relatively narrow) particle size distribution for optimal performance.

Example 4: Adhesion Promotion in Rubber

On a two-roll mill, the required phr of the free flowing, milled, dry powder ($D_{v90}$=15.9 µm; $D_{v50}$=6.25 µm; $(D_{v90}-D_{v10})/D_{v50}$=2.36) was mixed with 330 g of each masterbatch (stock compound including premixed elastomer, fillers and other curatives). Once fully incorporated, the compound was sheeted off and prepared for comparative testing.

|  | NR1 | NR2 | NR3 | NBR1 | NBR2 | NBR3 | EPDM1 | EPDM2 | EPDM3 |
|---|---|---|---|---|---|---|---|---|---|
| NR | 100 |  |  | 100 |  |  | 100 |  |  |
| NBR |  | 100 |  |  | 100 |  |  | 100 |  |
| EPDM |  |  | 100 |  |  | 100 |  |  | 100 |
| Free flowing, milled dry powder | 0 | 6 | 10 | 0 | 6 | 10 | 0 | 6 | 10 |
| Rheometer 165° C. | | | | | | | | | |
| ML | 0.62 | 0.33 | 0.30 | 0.74 | 0.63 | 0.63 | 0.75 | 0.95 | 0.75 |
| MH | 7.68 | 7.02 | 6.93 | 14.07 | 14.32 | 14.87 | 8.31 | 8.99 | 8.41 |
| Ts2 | 1:13 | 1:14 | 1:15 | 1:10 | 0:50 | 0:45 | 2:28 | 4:29 | 2:40 |
| T90 | 2:00 | 2:13 | 2:17 | 3:43 | 4:59 | 6:22 | 10:33 | 11:49 | 10.21 |
| Tensile Testing | | | | | | | | | |
| Hardness | 49 | 49 | 49 | 65 | 68 | 68 | 51 | 52 | 53 |
| 100% Modulus [Mpa] | 1.06 | 1.09 | 1.07 | 1.91 | 2.21 | 2.31 | 1.01 | 1.09 | 1.08 |

|                      | NR1   | NR2   | NR3   | NBR1  | NBR2  | NBR3  | EPDM1 | EPDM2 | EPDM3 |
|----------------------|-------|-------|-------|-------|-------|-------|-------|-------|-------|
| 300% Modulus [Mpa]   | 2.74  | 3.02  | 2.89  | 5.20  | 6.32  | 6.89  | 2.95  | 2.88  | 2.83  |
| Tensile Strength [Mpa]| 17.98 | 11.68 | 12.90 | 12.01 | 11.21 | 11.35 | 18.43 | 13.53 | 12.76 |
| Elongation@ B'k [%]  | 702   | 604   | 648   | 605   | 486   | 460   | 853   | 880   | 844   |

Incorporation in the stock NR led to small changes in cure behaviour but there was a clear drop in tensile strength and elongation at the addition levels used. Incorporation in the stock NBR led to a higher scorch level and there was a clear increase in the hardness of the resulting compound and a decrease in the elongation. Incorporation in the stock EPDM led to only small changes in cure behaviour but there was a clear drop in tensile strength at the addition levels used.

Using compression molding, each compound was cured at 160° C. for 20 minutes against grit blasted steel. Peel forces were obtained at 50 mm/minute. Increases in adhesion can be observed against the grit blasted metal however adhesion to fabric has shown even greater bonding performance and has potential for several applications.

|                   | NR1 | NR2  | NR3  | NBR1 | NBR2 | NBR3 | EPDM1 | EPDM2 | EPDM3 |
|-------------------|-----|------|------|------|------|------|-------|-------|-------|
| Peel force [N/mm] | 0   | 4.61 | 5.03 | 0    | 7.32 | 7.60 | 0     | 4.89  | 6.44  |

Thus, a dry powder composition comprising a thermosetting resin in particulate form can be used as an additive for promoting adhesion in a polymer compound.

The invention claimed is:

1. A dry powder composition comprising a thermosetting resin in particulate form, wherein the dry powder composition has a particle size measured according to ISO 13320 (2009) characterized by
   a $D_{v90}$ of 50 µm or lower,
   a $D_{v50}$ in the range of 5.1 to 12.5 µm, and
   a ratio of $$\frac{Dv90 - Dv10}{Dv50}$$

in the range of 1.5 to 4.2.

2. The dry powder composition according to claim 1, wherein the dry powder composition has a particle size $D_{v90}$ measured according to ISO 13320 (2009) of 45 µm or lower.

3. The dry powder composition according to claim 1, wherein the dry powder composition has a particle size $D_{v50}$ measured according to ISO 13320 (2009) in the range of 6 to 12 µm.

4. The dry powder composition according, to claim 1, wherein the dry powder composition has a ratio of $$\frac{Dv90 - Dv10}{Dv50}$$

in the range of 2.0 to 3.8.

5. The dry powder composition according claim 1, wherein the dry powder composition has a particle size $D_{v99}$ measured according to ISO 13320 (2009) of 90 µm or lower.

6. The dry powder composition according to claim 1, wherein the thermosetting resin is a phenolic resin.

7. The dry powder composition according to claim 1, wherein the dry powder composition further comprises a curative and at least one inorganic particulate material.

8. The dry powder composition according to claim 7, wherein the curative is selected from the group consisting of hexamethylenetetramine and hexamethoxymethylmelamine.

9. The dry powder composition according to claim 7, wherein the inorganic particulate material is selected from a group consisting of anti-caking additives, anti-corrosive pigments and inorganic fillers.

10. The dry powder composition according to claim 1, wherein the dry powder composition comprises, based on the total weight of the dry powder composition
    thermosetting resin in an amount of 60 to 90%,
    anti-caking additive in an amount of 1 to 10% by weight,
    curative in an amount of 1 to 10% by weight,
    anti-corrosive pigments in an amount of 5 to 25% by weight, and
    optionally inorganic filler in an amount of 0 to 15% by weight.

11. The dry powder composition according to claim 10, wherein the anti-caking additive is silica.

12. The dry powder composition according to claim 10, wherein the anti-corrosive pigment is selected from a group consisting of zinc oxide, zinc phosphate, titanium dioxide, aluminum triphosphate and a combination thereof.

13. The dry powder composition according to claim 10, wherein the inorganic filler is selected from a group consisting of carbon black, clay, $CaCO_3$ and a combination thereof.

14. A bonding material selected from a group consisting of coating, primer, adhesive and adhesion promoter comprising the dry powder composition of claim 1.

15. An article selected from the group consisting of a brake pad and a brake shoe comprising the dry powder composition of claim 1.

16. A rubber compound comprising the dry powder composition of claim 1.

17. A process for preparing the dry powder composition according to claim 1, the process comprising the steps:
    (i) providing a precursor composition comprising a thermosetting resin in particulate form, and
    (ii) jet milling the precursor composition in a the jet mill until a particle size $D_{v90}$ measured according to ISO 13320 (2009) of 50 µm or lower is reached.

18. The process according to claim 17, wherein the jet milling is carried out until a particle size $D_{v50}$ measured according to ISO 13320 (2009) in the range of 5.1 to 12.5 µm is reached.

19. The process according to claim 17, wherein the jet mill comprises a classifier wheel.

20. A process of applying a dry powder composition to a metal surface, the process comprising the step:
(i) applying the dry powder composition according to claim 1 onto a metal surface by means of electrostatic spraying or fluidized bed dipping.

* * * * *